Feb. 26, 1946. H. J. DE N. McCOLLUM 2,395,568
HEATER
Filed Oct. 6, 1943
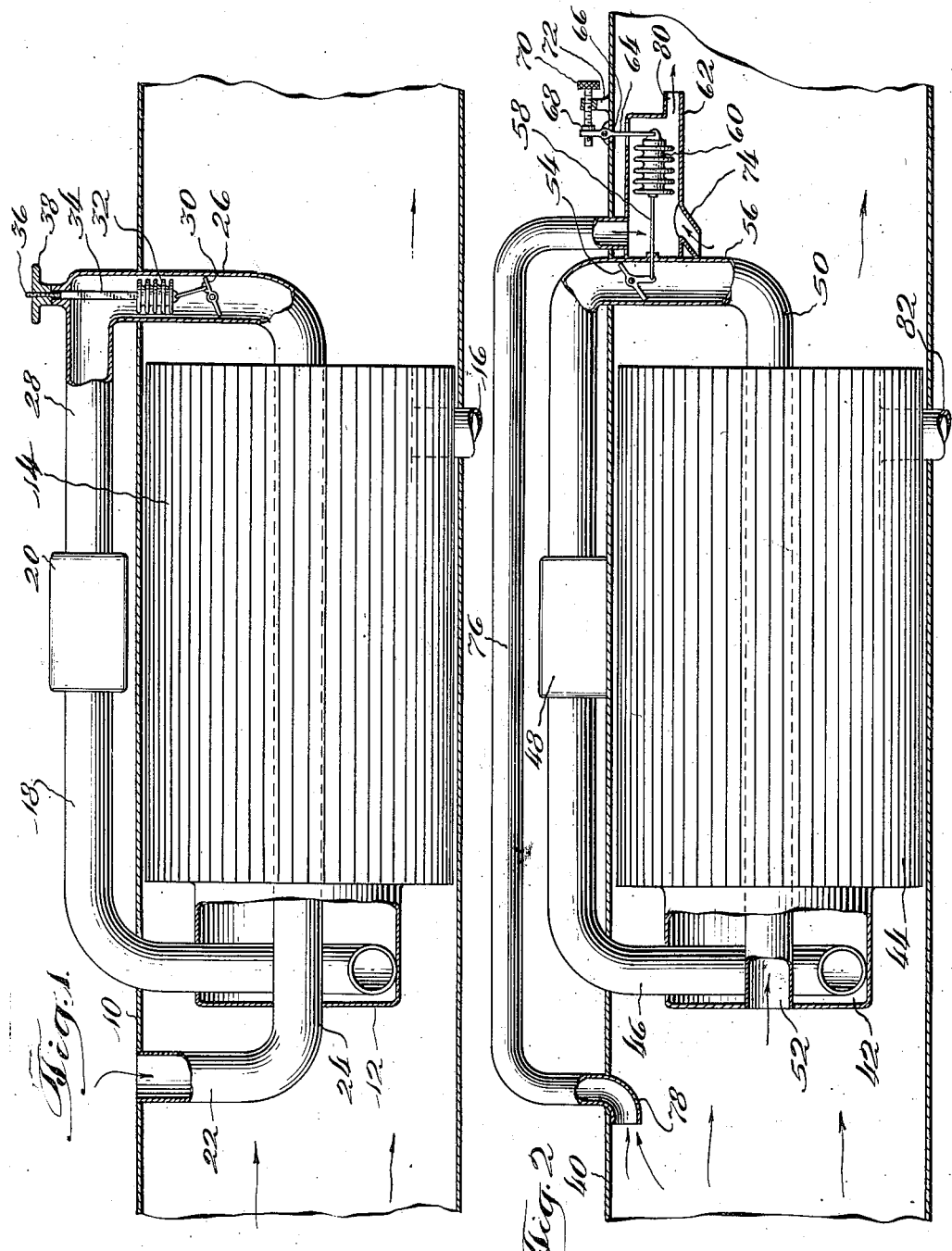

Patented Feb. 26, 1946

2,395,568

UNITED STATES PATENT OFFICE 2,395,568

HEATER

Henry J. De N. McCollum, Chicago, Ill.; Thelma McCollum executrix of said Henry J. De N. McCollum, deceased Application October 6, 1943, Serial No. 505,115

13 Claims. (Cl. 126—116)

My invention pertains to heaters and more particularly to heaters of the internal combustion type especially adapted for, but not limited to, use in heating ventilating air supplied to aircraft cabins and other suitable spaces.

An object of my invention is to provide a new and improved heater having an exceedingly simple and inexpensive control for automatically varying the heat output of the heater in accordance with the varying needs of the installation of which it forms a part.

Other objects and advantages will become apparent as the description proceeds.

In the drawing:

Fig. 1 is a longitudinal, sectional view of a heater installation embodying one form of my invention; and Fig. 2 is a similar view of a different heater installation embodying a second form of my invention.

In Fig. 1, I have illustrated a heater installation including a ventilating air duct 10 whose lefthand end is to be considered as connected to a ram, blower, or other suitable source of supply of ventilating air. The righthand end of the ventilating air duct may lead directly to an aircraft cabin or other space to be heated, or may communicate therewith through any suitable duct arrangement having one or more outlets, as desired. The ventilating air flowing through the duct 10 passes over a heater comprising a combustion chamber 12 and a heat exchanger 14. The combustion chamber 12 may be provided with the usual electrical igniter, not shown, and the heat exchanger may be of any usual or suitable construction. The products of combustion formed in the combustion chamber 12 pass into the heat exchanger 14 and are discharged through an exhaust pipe 16.

The combustion chamber 12 is provided with a combustible mixture of fuel and air through an induction tube 18 which connects the combustion chamber 12 with a carburetor 20 of any conventional or suitable type. This carburetor may be supplied with gasoline or other fuel from any suitable source. The duct 10 is provided with a suitable opening receiving the inlet end of a combustion air pipe 22 having a longitudinal section 24 extending lengthwise of the heater through the combustion chamber 12 and heat exchanger 14. This longitudinal section 24 is connected to the carburetor 20 by a laterally extending section 26 and a further section 28 which is located exteriorly of the duct 10.

Air is circulated through the combustion air supply pipe, carburetor, induction pipe, combustion chamber, heat exchanger, and exhaust pipe, either by creating a pressure by means of a ram or blower connected to the inlet end of the combustion air supply pipe 22, or by creating suction at the outlet of the exhaust pipe 16, or by a combination of both. The rate of flow of this combustion air is regulated by a butterfly valve 30 controlled by a temperature responsive bellows or sylphon 32 mounted on a rod 34 extending through a wall of a portion of the combustion air supply pipe and terminating in a threaded end 36 and engaged by an adjusting nut 38. The nut 38 can be manually set to provide any desired position of the valve 30 for any given temperature of the combustion air flowing around the bellows 32. For any given setting of the nut 38, accurate flow of the control of combustion air is automatically established by contraction or expansion of the bellows 32 in accordance with temperature variations of the combustion air flowing over this bellows. Since the fuel delivered by the carburetor 20 is proportional to the air flowing therethrough, control of the combustion air flow effectively controls the combustible mixture delivered to the combustion chamber 12 and, therefore, the heat output of the heater.

In normal operation, combustion air entering the pipe 22 flows through the center of the combustion chamber 12 and heat exchanger 14 and absorbs heat therefrom. This combustion air then passes into the laterally extending portion 26 of the combustion air pipe containing the temperature responsive bellows 32. This portion of the combustion air pipe is exposed to the ventilating air leaving the heat exchanger 14. When the combustion air is heated to too high a temperature, the bellows 32 expands and reduces the flow of combustion air, thereby reducing the heat output of the heater. On the other hand, when the combustion air is insufficiently heated, the bellows 32 contracts and permits more combustion air to flow to the heater to thereby increase the heat output thereof. In this manner, the heater is effectively controlled to deliver at all times a quantity of heat proportional to the then existing needs of the installation.

In Fig. 2, I have illustrated a second form of my invention comprising a ventilating air duct 40 enclosing a heater having a combustion chamber 42 and heat exchanger 44. A combustible mixture is delivered to the combustion chamber 42 through an induction pipe 46 connected to a carburetor 48 supplied with combustion air through a combustion air supply pipe 50.

A portion of the combustion air supply pipe extends centrally through the heat exchanger 44 and combustion chamber 42 and the inlet end 52 of this supply pipe is located in the end wall of the combustion chamber 42 so that the same ram or other air supply means which delivers air to the duct 40 furnishes the combustion air for the carburetor 48. Flow of this combustion air to the carburetor is controlled by a butterfly valve 54 located in a laterally extending portion 56 of the combustion air pipe 50.

The position of the valve 54 is controlled by a rod 58 connecting this valve with a temperature responsive bellows or Sylphon 60 mounted in a housing 62 located in the duct 40 and attached to the rear wall of the portion 56 of the combustion air supply pipe. The bellows 60 is supported at one end on a lever 64 pivotally mounted on a pin 66 carried by a wall of the duct 40. The other end of the lever 64 is pivotally connected to a collar 68 for movement therewith. This collar is swivelled on the end of a screw 70 which threadedly engages a post 72 attached to a wall of the duct 40 and which may be adjusted to provide any desired initial setting of the valve 54.

In this form of my invention the automatic temperature control for the valve 54 is differentially responsive to the temperature of the ventilating air leaving the heater and to the temperature of the ventilating air supplied to this heater. Since the latter temperature is the same as the temperature of the combustion air entering the inlet 52 of the combustion air supply pipe 50, the automatic temperature control is also differentially responsive to the temperature of the ventilating air leaving the heater and the temperature of the combustion air entering the combustion air supply pipe. This differential control is effected by providing the housing 62 with the particular arrangement of inlet and outlet means which I shall now describe.

As clearly shown in this Fig. 2, the housing 60 has an inclined inlet 74 which connects the interior of the housing with the interior of the ventilating air duct 40 adjacent to and downstream from the righthand end of the heat exchanger 44. Air is also supplied to the housing 62 by a pipe 76 having its inlet end 78 located in the duct 40 upstream of the heater. Except for its inlet and outlet ends, the pipe 76 is located externally of the duct 40 so that the air delivered to the housing 60 through this pipe is at the same temperature as the ventilating and combustion air delivered to the lefthand end of the heater.

In the housing 62, the heated ventilating air supplied through inlet 74 mixes with the cool air delivered by the pipe 76 and this admixture flows over the bellows 60 to determine the position of the valve 54. This admixture then passes through the housing outlet 80 and mixes with the ventilating air supplied to the aircraft cabin or other space or spaces.

In the operation of that embodiment of my invention shown in Fig. 2, a single ram or blower may supply both the ventilating and combustion air. The combustion air passes into the inlet end 52 of the combustion air pipe and absorbs heat from the combustion chamber 42 and heat exchanger 44. This air then passes to carburetor 48 where it is mixed with fuel and the combustible mixture formed by this carburetor is then delivered to the combustion chamber 42. The combustion occurring in this chamber creates hot products of combustion which flow into the heat exchanger 44 and are ultimately discharged to atmosphere through the exhaust pipe 82 after giving up their heat to the walls of the combustion chamber and heat exchanger.

Ventilating air flows over the combustion chamber 42 and heat exchanger 44, absorbing heat therefor and then passes to the aircraft cabin or other space connected with the righthand end of the duct 40. A small proportion of the air delivered to the duct 40 flows around the heater by way of pipe 76 and directly into the housing 62, where it mixes with ventilating air entering this housing by way of inlet 74. This admixture of heated ventilating air and unheated air passes over bellows 60 and is discharged into the ventilating air stream through outlet 80.

The temperature of the mixture flowing over the valve control bellows 60 will be affected both by the temperature of the air delivered to the heater and by the temperature of the ventilating air leaving this heater. When the heater is first started, the ventilating air leaving the heater will be at the same temperature as that delivered to the heater, so that the maximum quantity of combustible mixture would ordinarily be delivered to the heater when it is first started. After the heater has attained normal operating temperature, the ventilating air leaving the heater has had its temperature raised by passing over the heater and this increase in the temperature of the ventilating air will tend to expand the bellows 60 and restrict the air flow to the carburetor 48.

On the other hand, if the air delivered to the heater is extremely cold, the low temperature of the air delivered to the housing 62 through pipe 76 may prevent expansion of the bellows 60 and maintain the maximum heater operation. This differential control of the throttle valve for the combustion air is more sensitive than the control shown in Fig. 1 and is the preferred form of my invention.

It is to be understood that my invention is not limited to the particular details shown and described herein, but may assume numerous other forms and that my invention includes all other modifications, variations and equivalents coming within the following claims.

I claim:

1. Apparatus of the class described, comprising a ventilating air duct, a heater comprising means forming a combustion chamber and heat exchanger located in said duct, a carburetor for supplying combustible mixture to said combustion chamber, an air supply pipe for said carburetor extending through said combustion chamber and heat exchanger, a valve for controlling flow through said pipe, a temperature responsive means in said pipe between said heat exchanger and carburetor, and a connection between said last named means and said valve.

2. Apparatus of the class described, comprising a ventilating air duct, means forming a combustion chamber located in said duct, a heat exchanger receiving products of combustion from said combustion chamber and located in said duct, a carburetor for supplying a combustible mixture to said combustion chamber, a separate source of air supply for said carburetor, means for pre-heating the air supply to said carburetor, a valve controlling air flow to said carburetor, and temperature responsive control means for said valve located in said duct downstream of said heat exchanger.

3. A heater of the class described, comprising means forming a combustion chamber, a heat exchanger receiving hot products of combustion from said chamber, a carburetor for supplying a combustible mixture to said combustion chamber, an air supply pipe for said carburetor extending through said combustion chamber and heat exchanger, means for regulating the flow of air through said pipe to said carburetor, and temperature responsive means in said pipe for controlling said last-named means.

4. A heater of the class described, comprising means forming a combustion chamber, a heat exchanger receiving hot products of combustion from said chamber, a carburetor for supplying a combustible mixture to said combustion chamber, an air supply pipe for said carburetor extending through said combustion chamber and heat exchanger, means for regulating the flow of air through said pipe to said carburetor, temperature responsive means in said pipe for controlling said last-named means, and a manual adjustment for said temperature control means.

5. Heating apparatus of the class described, comprising a ventilating air duct, means forming a combustion chamber located in said duct, a heat exchanger located in said duct and receiving hot products of combustion from said combustion chamber, a carburetor for supplying a combustible mixture to said combustion chamber, an air supply pipe for said carburetor, and means differentially responsive to air temperatures in said duct on opposite sides of said heat exchanger for variably regulating air flow to said carburetor.

6. Heating apparatus of the class described, comprising a ventilating air duct, means forming a combustion chamber and heat exchanger located therein, a carburetor for supplying combustible mixture to said combustion chamber, a combustion air pipe for said carburetor extending through said combustion chamber and heat exchanger and communicating with the interior of said duct upstream of said combustion chamber, a throttle valve for controlling flow through said pipe to said carburetor, a temperature responsive bellows for variably positioning said valve, a housing enclosing said bellows, means for supplying the interior of said housing with heated ventilating air, means for supplying the interior of said housing with unheated ventilating air, and means for manually positioning said bellows and valve.

7. Apparatus of the class described, comprising a heater having a combustion chamber and heat exchanger, a carburetor for supplying combustible mixture to said combustion chamber, an air supply pipe for said carburetor extending through said combustion chamber and heat exchanger, a valve for controlling flow through said pipe, a temperature responsive means in said pipe between said heat exchanger and carburetor, and a connection between said last named means and said valve.

8. Apparatus of the class described, comprising a ventilating air duct, means forming a combustion chamber located in said duct, a carburetor for supplying a combustible mixture to said combustion chamber, a separate source of air supply for said carburetor, means for pre-heating the air supply to said carburetor, a valve controlling air flow to said carburetor, and temperature responsive control means for said valve located in said duct downstream of said combustion chamber.

9. A heater of the class described, comprising means forming a combustion chamber, a heat exchanger receiving hot products of combustion from said chamber, a carburetor for supplying a combustible mixture to said combustion chamber, an air supply pipe for said carburetor extending through said heat exchanger, means for regulating the flow of air through said pipe to said carburetor, and temperature responsive means in said pipe for controlling said last-named means.

10. A heater of the class described, comprising means forming a combustion chamber, a heat exchanger receiving hot products of combustion from said chamber, a carburetor for supplying a combustible mixture to said combustion chamber, an air supply pipe for said carburetor extending through said combustion chamber, means for regulating the flow of air through said pipe to said carburetor, temperature responsive means in said pipe for controlling said last-named means, and a manual adjustment for said temperature control means.

11. Heating apparatus of the class described, comprising a ventilating air duct, means forming a combustion chamber, a heat exchanger located in said duct and receiving hot products of combustion from said combustion chamber, a carburetor for supplying a combustible mixture to said combustion chamber, an air supply pipe for said carburetor, and means located in said duct and differentially responsive to air temperature in said duct on opposite sides of said heat exchanger for variably regulating air flow to said carburetor.

12. Heating apparatus of the class described, comprising a ventilating air duct, means forming a combustion chamber and heat exchanger located therein, a carburetor for supplying combustible mixture to said combustion chamber, a combustion air pipe for said carburetor extending through said combustion chamber and heat exchanger and communicating with the interior of said duct upstream of said combustion chamber, a throttle valve for controlling flow through said pipe to said carburetor, a temperature responsive bellows for variably positioning said valve, a housing enclosing said bellows, means for supplying the interior of said housing with heated ventilating air, and means for supplying the interior of said housing with unheated ventilating air.

13. A heater of the class described comprising a ventilating air duct, means forming a combustion chamber located in said duct, a heat exchanger located in said duct and receiving hot products of combustion from said combustion chamber, a carburetor for supplying a combustible mixture to said combustion chamber, an air supply pipe for said carburetor extending through said combustion chamber and heat exchanger, a valve in said pipe for regulating the flow of preheated air through said pipe to said carburetor, a bellows for controlling said valve in response to temperature variations, and a manual adjustment for said bellows and valve.

HENRY J. DE N. McCOLLUM.